United States Patent
Wang et al.

(10) Patent No.: US 11,007,639 B2
(45) Date of Patent: May 18, 2021

(54) JOINT CONTROL METHOD FOR SERIAL ROBOT AND SERIAL ROBOT USING THE SAME

(71) Applicant: UBTECH ROBOTICS CORP LTD, Shenzhen (CN)

(72) Inventors: Yuesong Wang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 104 days.

(21) Appl. No.: 16/669,554

(22) Filed: Oct. 31, 2019

(65) Prior Publication Data
US 2020/0206942 A1    Jul. 2, 2020

(30) Foreign Application Priority Data
Dec. 30, 2018    (CN) .......................... 2018116489641

(51) Int. Cl.
| | | |
|---|---|---|
| *B25J 9/06* | (2006.01) | |
| *B25J 13/08* | (2006.01) | |
| *B25J 9/04* | (2006.01) | |
| *B25J 9/16* | (2006.01) | |
| *B25J 17/02* | (2006.01) | |

(52) U.S. Cl.
CPC .................. *B25J 9/06* (2013.01); *B25J 9/046* (2013.01); *B25J 9/065* (2013.01); *B25J 9/1602* (2013.01); *B25J 13/085* (2013.01); *B25J 13/088* (2013.01); *B25J 17/0283* (2013.01); *G05B 2219/39261* (2013.01)

(58) Field of Classification Search
CPC ..... B25J 9/046; B25J 9/06; B25J 9/065; B25J 9/1602; B25J 9/1664; B25J 13/085; B25J 13/088; B25J 17/0283; G05B 2219/39261; G05B 2219/42153
See application file for complete search history.

(56) References Cited

U.S. PATENT DOCUMENTS

| | | | | |
|---|---|---|---|---|
| 5,377,310 A | * | 12/1994 | Jain ........................ | B25J 9/1615 700/260 |
| 6,027,238 A | * | 2/2000 | Nagashima ............ | B25J 9/1607 318/568.1 |
| 2005/0209536 A1 | * | 9/2005 | Dariush ............... | A61B 5/1121 600/595 |
| 2020/0061835 A1 | * | 2/2020 | Haddadin .............. | B25J 9/1694 |

FOREIGN PATENT DOCUMENTS

| | | |
|---|---|---|
| CN | 103901898 B | 8/2016 |

* cited by examiner

*Primary Examiner* — Dale Moyer

(57) ABSTRACT

The present disclosure provides a joint control method for a serial robot and a serial robot using the same. The method includes: performing a analysis on an end joint in the plurality of joints, and calculating the force of the previous joint acting on the end joint; performing a analysis on each of the other joints in the plurality of joints, and calculating the force of the previous joint acting on the joint; obtaining an angular velocity and an angular acceleration of each joint after obtaining the force of the previous joint acting on the joint, and calculating a torque corresponding to each joint; and projecting the torque corresponding to each joint to a motor corresponding to the joint to obtain a torque to be applied to the motor at a current time. In this manner, which improves the tracking precision of the end joint while reduces the tracking error.

16 Claims, 7 Drawing Sheets

JOINT CONTROL METHOD FOR SERIAL ROBOT AND SERIAL ROBOT USING THE SAME

CROSS REFERENCE TO RELATED APPLICATIONS

This application claims priority to Chinese Patent Application No. 201811648964.1, filed Dec. 30, 2018, which is hereby incorporated by reference herein as if set forth in its entirety.

BACKGROUND

1. Technical Field

The present disclosure relates to robot technology, and particularly to an joint control method for a serial robot and a serial robot using the same.

2. Description of Related Art

For serial robots, because of their high nonlinearity and high couplingness, its dynamics problem has received extensive attentions. The full dynamics equation of a serial robot of n degree of freedom (DOF) is:

$$M \cdot \ddot{\theta} + C \cdot \dot{\theta} + G = \tau - J^r \cdot F;$$

where, $\dot{\theta}$ is the angular velocity of the joint, $\ddot{\theta}$ is the angular acceleration of the joint, $\tau$ is the motor torque of each joint, $J^r$ is a transpose matrix of the Jacobian matrix of a centroid of an end joint of the serial robot, F is an external force acting on the end joint of the serial robot, M is a mass inertia matrix of the serial robot, C is n speed item matrix of the serial robot, and G is a gravity item matrix of the serial robot.

In the case that the above-mentioned full dynamics equation is to be used to calculate a torque of a motor of each joint, the matrixes of M, C, G, and the like need to be obtained first. However, due to the high nonlinearity and high couplingness of the serial robot, the processes of calculating the matrixes of M, C, G, and the like are very complicated, the efficiency of executing the algorithm is low, and the execution time is long. In the case that the serial robot has higher degree of freedom, it will be unaffordable to be applied to the hard real-time control system with the period of 1 millisecond.

BRIEF DESCRIPTION OF THE DRAWINGS

To describe the technical schemes in the embodiments of the present disclosure more clearly, the following briefly introduces the drawings required for describing the embodiments or the prior art. It should be understood that, the drawings in the following description merely show some embodiments of the present disclosure, hence should not be considered as limitations to the scope of the present disclosure. For those skilled in the art, other drawings can be obtained according to the drawings without creative efforts.

DETAILED DESCRIPTION

Figure 1:
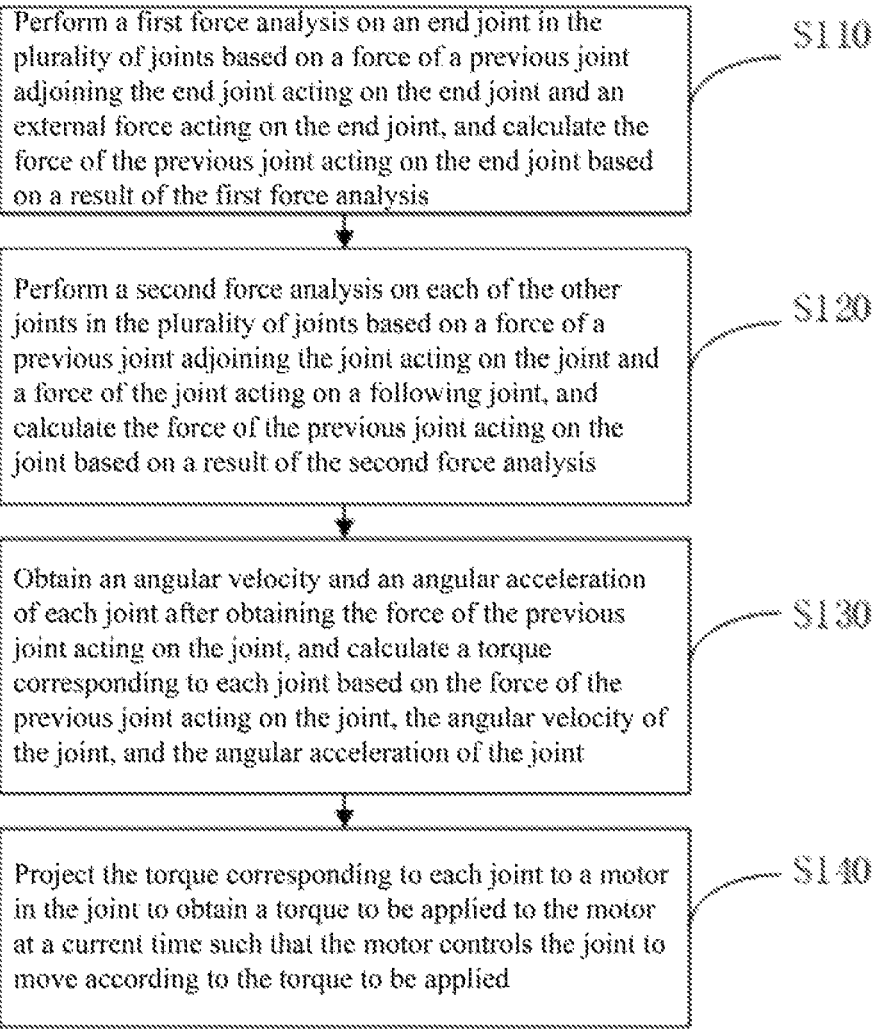
FIG. 1 is a flow chart of an embodiment of a joint control method for a serial robot according to the present disclosure.

In the following descriptions, the technical solutions in the embodiments of the present disclosure are clearly and completely described with reference to the drawings in the embodiments of the present disclosure. It is obvious that the described embodiments are only a part of the embodiments of the present disclosure, rather than all embodiments. Generally, the components of the embodiments of the present disclosure which are described and illustrated in the drawings can be disposed and designed in various configurations. Therefore, the following detailed description for the embodiments in the drawings are not intended to limit the scope of the present disclosure, but merely to represent the embodiments of the present disclosure. All other embodiments obtained by those skilled in the art based on the embodiments of the present disclosure without creative efforts are within the scope of the prevent disclosure.

EXAMPLE ONE

FIG. 1 is a flow chart of an embodiment of a joint control method for a serial robot according to the present disclosure. In this embodiment, an acceleration compensation method for a serial robot is provided. In which, the serial robot includes joints connected in series, where the joints each includes a motor and a connecting rod driven by the motor. The method is a computer-implemented method executable for a processor of the robot, which may be implemented through and applied to an acceleration compensation apparatus shown in FIG. 5 or a serial robot shown in FIG. 6, or implemented through a computer readable storage medium.

Figure 2:
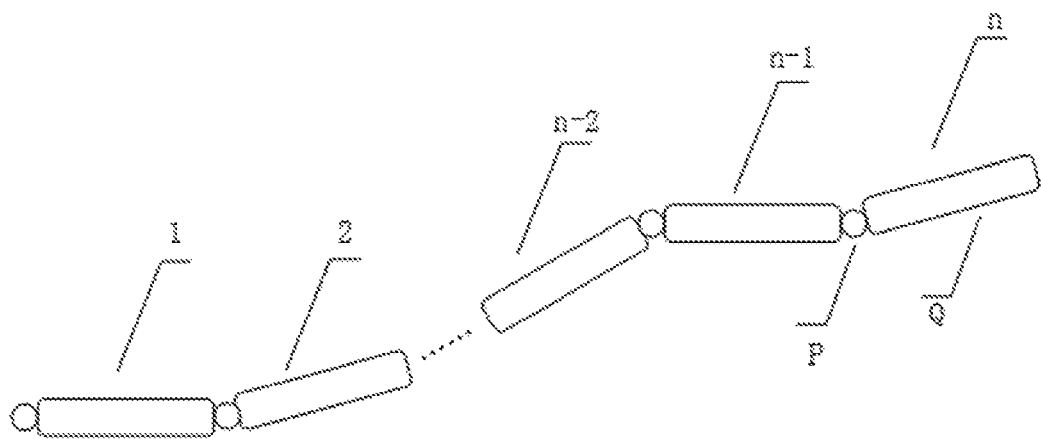
FIG. 2 is a schematic diagram of the structure of joints of a serial robot according to an embodiment of the present disclosure.

FIG. 2 is a schematic diagram of the structure of joints of a serial robot according to an embodiment of the present disclosure. As shown in FIG. 2, the serial robot may include a plurality of joints 1-n which are connected in series sequentially. In which, the first joint and the second joint are connected in series, the second joint and the third joint are connected in series, the third joint and the fourth joint are connected in series, . . . , the n-1-th joint and the n-th joint are connected in series, where the last joint of the serial robot, that is, the n-th joint can be regarded as an end joint, the other end (i.e., the terminal) of the end joint which is not connected with another joint can be connected in series with, for example, a mechanical claw or the like. Each joint includes a motor P and a connecting rod Q driven by the motor P.

As shown in FIG. 1, the joint control method includes the following steps.

S110: performing a first force analysis on an end joint in the plurality of joints based on a force of a previous joint adjoining the end joint acting on the end joint and an external force acting on the end joint, and calculating the force of the previous joint acting on the end joint based on a result of the first force analysis.

In this embodiment, before step S110, the method may further include:

constructing a structure array for each joint of the serial robot, where the structure array includes joint attribute information and joint motion information calculated based on the joint attribute information, and the joint motion information includes the angular velocity of the joint and the angular acceleration of the joint.

In this embodiment, one structure array is created for each joint of the serial robot, and the joint attribute information corresponding to the joint and the joint motion information calculated according to the joint attribute information are both stored in the structure array corresponding to the joint. All the joints of the serial robot can have a chain-type data structure corresponding to the order of series connection, so as to be convenient for executing the joint control method in a looping manner, and all the information of the joint can be recorded through such a simple data structure. In the execution process of the joint control method for the serial robot, all the information in the structure array corresponding to each joint can be directly called through a small amount of codes in a looping and iterative manner, thereby executing the joint control method for the serial robot efficiently.

In this embodiment, the joint attribute information includes a space vector of a rotational shaft of the motor in the joint and a rotational angle of the motor in the joint.

In this embodiment, the angular velocity of the joint is calculated based on the joint attribute information through the steps of:

calculating a posture of the joint in a world coordinate system based on the space vector of the rotational shaft of the motor in the joint and the rotational angle of the motor in the joint;

calculating an joint angle of the joint based on the posture of the joint in the world coordinate system; and differentiating the joint angle by time through the following equation to obtain the angular velocity of the joint:

$$\dot{\theta} = \frac{d\theta}{dt} = J_{end}^{-1} \cdot V;$$

where, $\dot{\theta}$ is the angular velocity of the joint, $\theta$ is the joint angle, $J_{end}^{-1}$ is an inverse matrix of the Jacobian matrix of a centroid of the end joint, and V is the velocity of the end joint.

The process of calculating the angular acceleration of each joint in the case that the torque of the joint is known is referred to as forward kinematics, while the process of calculating the torque of each joint in the case that the angular acceleration of the joint is known is referred to as inverse kinematics.

The posture of the joint in the world coordinate system is calculated through a forward kinematics equation based on the space vector of the rotational shaft of the motor in the joint and the rotational angle of the motor in the joint.

The joint attribute information further includes a vector of the coordinate system of the joint and a next coordinate system.

The position of the joint in the world coordinate system is calculated through the forward kinematics equation based on the vector of the coordinate system of the joint and the next coordinate system, the space vector of the rotational shaft of the motor in the joint, and the rotational angle of the motor in the joint.

The joint angle of the joint is calculated through the inverse dynamics equation based on the posture of the joint in the world coordinate system and the position of the joint in the world coordinate system.

Figure 3:
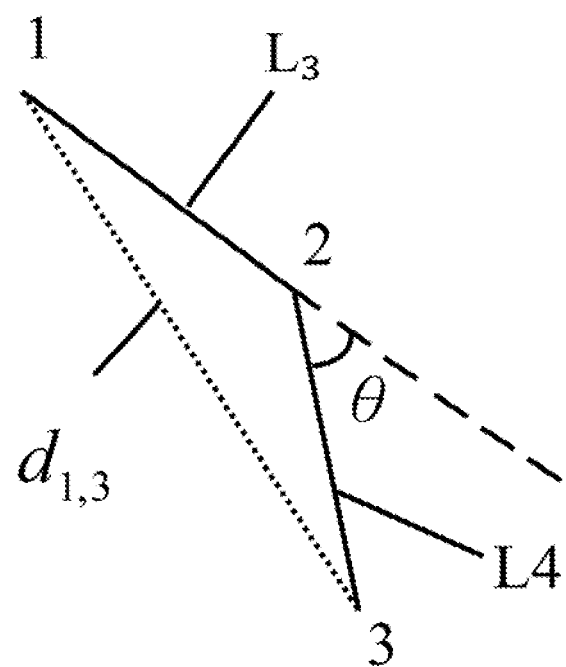
FIG. 3 is a geometrical schematic diagram of a joint angle according to an embodiment of the present disclosure.

FIG. 3 is a geometrical schematic diagram of a joint angle according to an embodiment of the present disclosure. As shown in FIG. 3, by taking a serial robot having three joints connected in series sequentially as an example, the process of calculating the joint angle of the second joint is as follows:

assuming that $r = \text{norm}(d_{1,3})$:

$$\theta = a\cos\frac{L_3^2 + L_4^2 + r^2}{2L_3 L_4} - \pi;$$

where, $\theta$ is the joint angle of the second joint, $L_3$ is the distance between the first joint and the second joint $L_4$ is the distance between the second joint and the third joint, $d_{1,3}$ is a positional vector between the third joint to the first joint which can be obtained through the posture of the third joint in the world coordinate system, the position of the third joint in the world coordinate system, and the position of the third joint in the world coordinate system.

In one embodiment, the Jacobian matrix of the centroid of the joint can be calculated through the following equation:

$$J_j = \begin{bmatrix} J_{11} & J_{12} & \ldots & J_{1i} \\ J_{21} & J_{22} & \ldots & J_{2i} \end{bmatrix};$$

where, $J_j$ is the Jacobian matrix of the centroid of the i-th joint, $J_{1i}$ is a linear velocity differential of the centroid of the i-th joint to the centroid of the j-th joint and $J_{3i} = Z_i \times D_{i\text{-}j}$, and $Z_i$ is the vector of the rotational shaft of the motor in the i-th joint, $D_{i\text{-}j}$ is the positional vector from the motor in the i-th joint to the centroid of the j-th joint, $J_{2i}$ is an angular velocity differential of the centroid of the i-th joint to the centroid of the j-th joint and $J_{2i} = Z_i$ while i=j.

It is worth noting that, the Jacobian matrixes of the centroid of the joints are calculated from the first joint, and for the subsequent joints, the Jacobian matrix corresponding to each joint is calculated based on itself and the Jacobian matrixes corresponding to the centroid of all the joints in front of the joint.

For example, the Jacobian matrix of the centroid of four joints can be calculated through the following equation:

$$J_4 = \begin{bmatrix} Z_1 \times D_{1\text{-}4} & Z_2 \times D_{2\text{-}4} & Z_3 \times D_{3\text{-}4} & Z_4 \times D_{4\text{-}4} \\ Z_1 & Z_2 & Z_3 & Z_4 \end{bmatrix};$$

where, $Z_1$ is the vector of the rotational shaft of the motor in the first joint, $Z_2$ is the vector of the rotational shaft of the motor in the second joint, $Z_3$ is the vector of the rotational shaft of the motor in the third joint, $Z_4$ is the vector of the rotational shaft of the motor in the fourth joint, $D_{1\text{-}4}$ is the positional vector of the motor of the first joint to the centroid of the fourth joint, $D_{2\text{-}4}$ is the positional vector of the motor of the second joint to the centroid of the fourth joint, $D_{3\text{-}4}$ is the positional vector of the motor of the third joint to the centroid of the fourth joint, and $D_{4\text{-}4}$ is the positional vector of the motor of the fourth joint to the centroid of the fourth joint.

In this embodiment, the angular acceleration of the joint can be calculated through the following equation:

$$\ddot{\theta} = J_{end}^{-1} \cdot (A - \dot{J}_{end} \cdot \dot{\theta});$$

where, $\ddot{\theta}$ is the angular acceleration of the joint, A is an acceleration of the centroid of the end joint, $\dot{J}_{end}$ is a matrix obtained by deriving the Jacobian matrix of the centroid of the end joint.

In which, the Jacobian matrix is derived by deriving each component of the Jacobian matrix.

For example, after deriving $J_{13} = Z_3 \times D_{3-4}$, it can obtain:

$$\dot{J}_{13} = \dot{Z}_3 \times D_{3-4} + Z_3 \times \dot{D}_{3-4}.$$

In this embodiment, the acceleration of the centroid of each joint in the serial robot can be calculated through the following steps:

obtaining a velocity of a coordinate system origin in the world coordinate system of each joint based on the angular velocity of the joint and the Jacobian matrix of the coordinate system origin of the joint;

obtaining a velocity of the centroid of the joint in the world coordinate system based on the velocity of the coordinate system origin in the world coordinate system of the joint; and deriving the velocity of the centroid of the joint in the world coordinate system by time to obtain the acceleration of the centroid of the joint.

In this embodiment, the velocity of the coordinate system origin of the joint in the world coordinate system can be calculated through the following equation:

$$v_i = J_{linko} \cdot \dot{\theta};$$

where, $v_i$ is the velocity of the coordinate system origin of the joint in the world coordinate system, and $J_{linko}$ is the Jacobian matrix of the coordinate system origin of the joint.

In this embodiment, the Jacobian matrix of the coordinate system origin of the joint can be through the following formula:

$$G_j = \begin{bmatrix} G_{11} & G_{12} & \ldots & G_{1i} \\ G_{21} & G_{22} & \ldots & G_{2i} \end{bmatrix};$$

where $G_j$ is the Jacobian matrix of the coordinate system origin of the i-th joint, $G_{1i}$ is a linear velocity differential of the coordinate system origin of the i-th joint to the coordinate system origin of the j-th joint and $G_{1i} = Z_i \times D1_{i-j}$, $Z_i$ is the vector of the rotational shaft of the motor of the i-th joint, $D1_{i-j}$ is a positional vector of the the motor of the i-th joint to the coordinate system origin of the j-th joint, $G_{2i}$ is an angular velocity differential of the coordinate system origin of the i-th joint to the coordinate system origin of the j-th joint and $G_{2i} = Z_i$ while i=j.

It is worth noting that, the Jacobian matrixes of the coordinate system origins are calculated from the first joint, and for the subsequent joints, the Jacobian matrix corresponding to each joint is calculated based on itself and the Jacobian matrixes corresponding to the coordinate system origin of all the joints in front of the joint.

For example, the Jacobian matrix of the coordinate system origins of four joints can be calculated through the following equation:

$$G_4 = \begin{bmatrix} Z_1 \times D1_{1-4} & Z_2 \times D1_{2-4} & Z_3 \times D1_{3-4} & Z_4 \times D1_{4-4} \\ Z_1 & Z_2 & Z_3 & Z_4 \end{bmatrix};$$

where, $Z_1$ is the vector of the rotational shaft of the motor in the first joint, $Z_2$ is the vector of the rotational shaft of the motor in the second joint, $Z_3$ is the vector of the rotational shaft of the motor in the third joint, $Z_4$ is the vector of the rotational shaft of the motor in the fourth joint, $D1_{1-4}$ is the positional vector of the motor of the first joint to the coordinate system origin of the fourth joint, $D1_{2-4}$ is the positional vector of the motor of the second joint to the coordinate system origin of the fourth joint, $D1_{3-4}$ is the positional vector of the motor of the third joint to the coordinate system origin of the fourth joint, and $D1_{4-4}$ is the positional vector of the motor of the fourth joint to the coordinate system origin of the fourth joint.

The velocity of the centroid of the joint in the world coordinate system can be calculated as follows: taking the velocity of a centroid of a 6-dimensional joint in a world coordinate system as an example, a 3-dimensional angular velocity of the centroid of the joint in the world coordinate system is equal to a 3-dimensional angular velocity of a coordinate system origin of the joint in the world coordinate system; a 3-dimensional line velocity of the centroid of the joint in the world coordinate is equal to a 3-dimensional angular velocity point of the coordinate system origin of the joint in the world coordinate system multiplied by the distance between the centroid of the joint and the coordinate system origin of the joint:

$$v_c = \begin{bmatrix} S1 \\ S2 \end{bmatrix} = \begin{bmatrix} S1 \\ S2 \cdot D_{c-n} \end{bmatrix};$$

where, $v_c$ is the 6-dimensional velocity of the centroid of the joint in the world coordinate system, S1 is the 3-dimensional angular velocity of the centroid of the joint in the world coordinate system, S2 is the 3-dimensional linear velocity of the centroid of the joint in the world coordinate system, and $D_{c-o}$ is the distance between the centroid of the joint and the coordinate system origin of the joint.

The acceleration of the centroid of the joint can be obtained through the following equation:

$$a = \frac{dv_c}{dt} = J_{link} \cdot \ddot{\theta} + \dot{J}_{link} \cdot \dot{\theta};$$

where, a is the acceleration of the centroid of the joint, and $J_{link}$ is the Jacoby matrix of the centroid of the joint.

In one embodiment, the acceleration of the centroid of the end joint can be calculated by the above-mentioned method of calculating the acceleration of the centroid of the joint:

obtaining a velocity of a coordinate system origin of the end joint in the world coordinate system based on the angular velocity of the end joint and the Jacobian matrix of the coordinate system origin of the end joint;

obtaining a velocity of the centroid of the end joint in the world coordinate system based on the velocity of the coordinate system origin of the end joint in the world coordinate system; and deriving the velocity of the centroid of the end joint in the world coordinate system by time to obtain the acceleration of the centroid of the end joint.

In one embodiment, the joint attribute information of each joint can be initialized at a preset interval, and the joint motion information can be calculated based on the initialized joint attribute information.

For example, an initialization process can be performed at every instruction cycle to reduce maintenance costs.

In one embodiment, after configuring each coordinate system of the serial robot, in the structure array of each joint, a positional relationship between the coordinate systems of the joints, the rotational shaft vector, the mass of each joint, the centroid position of each joint, the rotational inertia of each joint with respect to the centroid, and other data can be composed as a file in a certain order. In which, the structure array of all the joint are the same in the format, the data, and the file order. The file is quickly read according to a unified process, and the data in the files is assigned with initial values to complete the initialization process of the serial robot quickly and standardly, so as to be convenient for executing the complex kinematics algorithms in a looping manner.

For different serial robots, the length of the initialized file and related parameters can be different, while the joint control method to execute is same. The data part content required in the joint control method for the serial robot (i.e., the data stored in the structure array) and the method itself are separated to improve the execution speed of the algorithm and reduce the couplingness between algorithms.

As show in FIG. 2, the n-th joint is the end joint. The force acting on the n-th joint can be analyzed based on an interactive force of its previous joint (i.e., n-1-th joint) acting on it and an external force of an external object that acts on it when it touches the external object, and a gravity acting on the n-th joint, and a force of the n-1-th joint acting on the n-th joint can be obtained based on the planned acceleration of the centroid of the end joint and the analysis result of the force acting on the n-th joint.

Figure 4A:
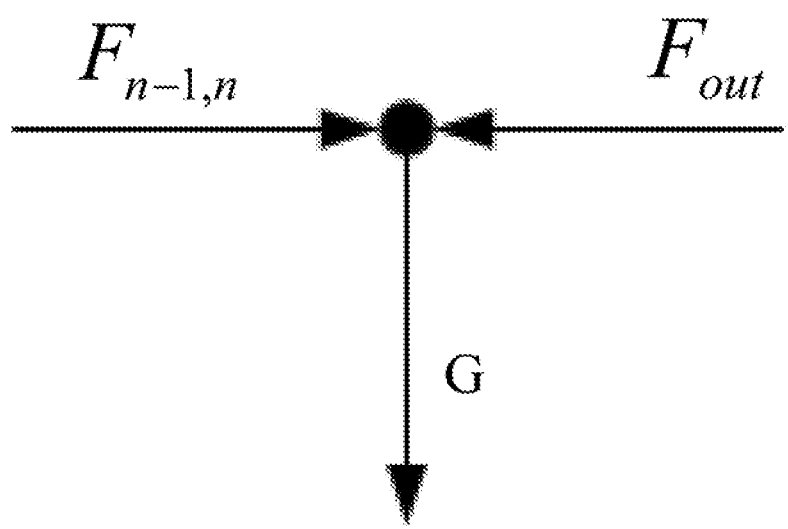
FIG. 4A is a schematic diagram of a force analysis of a joint according to an embodiment of the present disclosure.

FIG. 4A is a schematic diagram of a force analysis of a joint according to an embodiment of the present disclosure. As shown in FIG. 4A, for the n-th joint, that is, the end joint, it is subjected to an external force $F_{out}$, a force $F_{n-1,n}$ of the n-1-th joint acting on it, and the gravity G:

$$F_{n-1,n} + F_{out} + mg = ma;$$

where, a is the planned acceleration of the centroid of the end joint, $F_{out}$ is the external force which is zero while not contacting with the external environment, m is the mass of the end joint, g is the gravity acting on the end joint.

Then, $F_{n-1,n} = ma - mg - F_{out}$.

It should be pointed out that, since the forces between two objects are mutual, the force $F_{n-1,n}$ of the n-1-th joint acting on the n-th joint is also the force of the n-th joint acting on the n-1-th joint.

S120: performing a second force analysis on each of the other joints in the plurality of joints based on a force of a previous joint adjoining the joint acting on the joint and a force of the joint acting on a following joint, and calculating the force of the previous joint acting on the joint based on a result of the second force analysis.

As shown in FIG. 2, for each joint before the n-th joint, the force acting on the joint can be analyzed based on the interactive force of the previous joint that acts on the join, the interaction force of the join with respect to a subsequent joint adjoining the end joint, and the gravity acting on the join, and the acceleration of the centroid of the joint can be obtained from the structure array corresponding to the joint, and then the force of the joint acting on the previous joint can be obtained according to the acceleration of the centroid of the joint and the analysis result of the force acting on the joint.

Figure 4B:
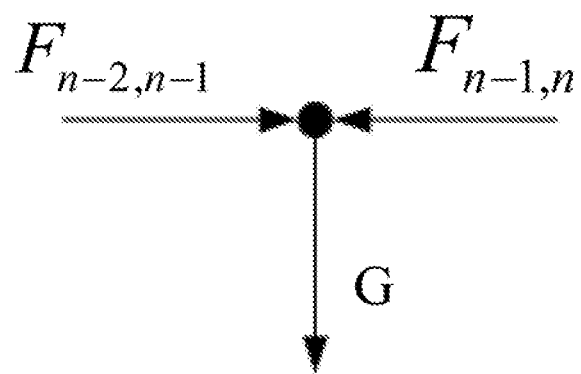
FIG. 4B is a schematic diagram of a force analysis of a joint according to another embodiment of the present disclosure.

FIG. 4B is a schematic diagram of a force analysis of a joint according to another embodiment of the present disclosure. As shown in FIG. 4B, the n-1-th joint is taken as an example for description. The n-1-th joint is subjected to three forces, namely: the force $F_{n-2,n-1}$ of the n-2th joint acting on it, the force $F_{n-1,n}$ of the n-th joint acting on it, and the gravity G.

$$F_{n-2,n-1} + F_{n-1,n} + m_{n-1}g = m_{n-1}a_{n-1};$$

where, $a_{n-1}$ is the acceleration of the centroid of the n-1-th joint, $m_{n-1}$ is the mass of the n-1-th joint, and g is the gravity of the n-1-th joint.

Then, $F_{n-2,n-1} = m_{n-1}a_{n-1} - F_{n-1,n} - m_{n-1}g$.

It should be pointed out that, since the forces between two objects are mutual, the force $F_{n-2,n-1}$ of the n-2-th joint acting on the n-1-th joint is also the force of the n-1-th joint acting on the n-2-th joint.

For each joint before the n-th joint, it is subjected to the influences of the force of the previous joint acting on it, the force of it acting on the subsequent joint, and gravity. Therefore, the force of the previous joint acting on it can be calculated through the force of the previous joint acting on it and the force of it acting on the subsequent joint, and the force of the previous joint acting on each joint can be calculated in an iterative manner.

S130: obtaining an angular velocity and an angular acceleration of each joint after obtaining the force of the previous joint acting on the joint, and calculating a torque corresponding to each joint based on the force of the previous joint acting on the joint, the angular velocity of the joint, and the angular acceleration of the joint.

In this embodiment, the stored angular velocity and angular acceleration of each joint are obtained from its corresponding structure array.

In this embodiment, the torque of the motor of the end joint can be calculated through the following equation:

$$N_{n-1,n} = I_n \ddot{\theta}_n + \dot{\theta}_n \times I_n \dot{\theta}_n - N_{out} - r_1 \times F_{n-1,n} - r_2 \times F_{out};$$

where, $N_{n-1,n}$ is the torque corresponding to the n-th joint, that is, the end joint, $I_n$ is a rotational inertia of the end joint of a centroid coordinate system of the end joint, $\dot{\theta}_n$ is the angular velocity of the n-th joint, $\ddot{\theta}_n$ is the angular acceleration of the n-th joint, $N_{out}$ is an external torque of an external environment to the end joint of the serial robot, $F_{n-1,n}$ is a force of the i-1-th joint to the i-th joint, $r_1$ is a vector of the force $F_{n-1,n}$ to a centroid of the i-th joint, $F_{out}$ is an external force of the external environment with respect to the end joint of the serial robot, $r_2$ is a vector of the force $F_{out}$ to the centroid of the i-th joint.

In this embodiment, the torque of the motor of each joint before the end joint can be calculated through the following formula:

$$N_{n-2,n-1} = I_{n-1} \ddot{\theta}_{n-1} + \dot{\theta}_{n-1} \times I_{n-1} \dot{\theta}_{n-1} - N_{out} - r_3 \times F_{n-2,n-1} - r_4 \times F_{n-1,n};$$

where, $N_{n-2,n-1}$ is the torque corresponding to the n-1-th joint, $I_{n-1}$ is the rotational inertia of a centroid coordinate system of the end joint, that is, the end joint, $\dot{\theta}_{n-1}$ is the angular velocity of the n-1-th joint, $\ddot{\theta}_{n-1}$ is the angular acceleration of the n-1-th joint, $N_{out}$ is an external torque of an external environment with respect to the end joint of the serial robot, $F_{n-2,n-1}$ is a force of the i-2-th joint acting on the i-1-th joint, $r_3$ is a vector of the force $F_{n-2,n-1}$ to a centroid of the i-1-th joint, $F_{n-1,n}$ is a force of the i-1-th joint acting on the i-th joint, $r_4$ is a vector of the force $F_{n-1,n}$ to the centroid of the i-1-th joint.

S140: projecting the torque corresponding to each joint to a motor in the joint to obtain a torque to be applied to the motor at a current time such that the motor controls the joint to move according to the torque to be applied.

In this embodiment, since the calculated torque corresponding to the joint is a vector, it needs to project the vector onto the rotating shaft of the motor in the joint to obtain a scalar of the torque that the motor in the joint should be applied at the current time through the following equation:

$$\tau_n = Z_n \cdot N_{n-1,n};$$

where, $\tau_n$ is the torque that the motor in the n-th joint should be applied at the current time, and $Z_n$ is the vector of the rotational shaft of the motor in the n-th joint.

After obtaining the torque that should be applied to the motor in the joint at the current time, it makes the motor in the joint controls the connecting rod driven by the motor in the joint to move according to the torque to be applied.

EMBODIMENT TWO

Figure 5:
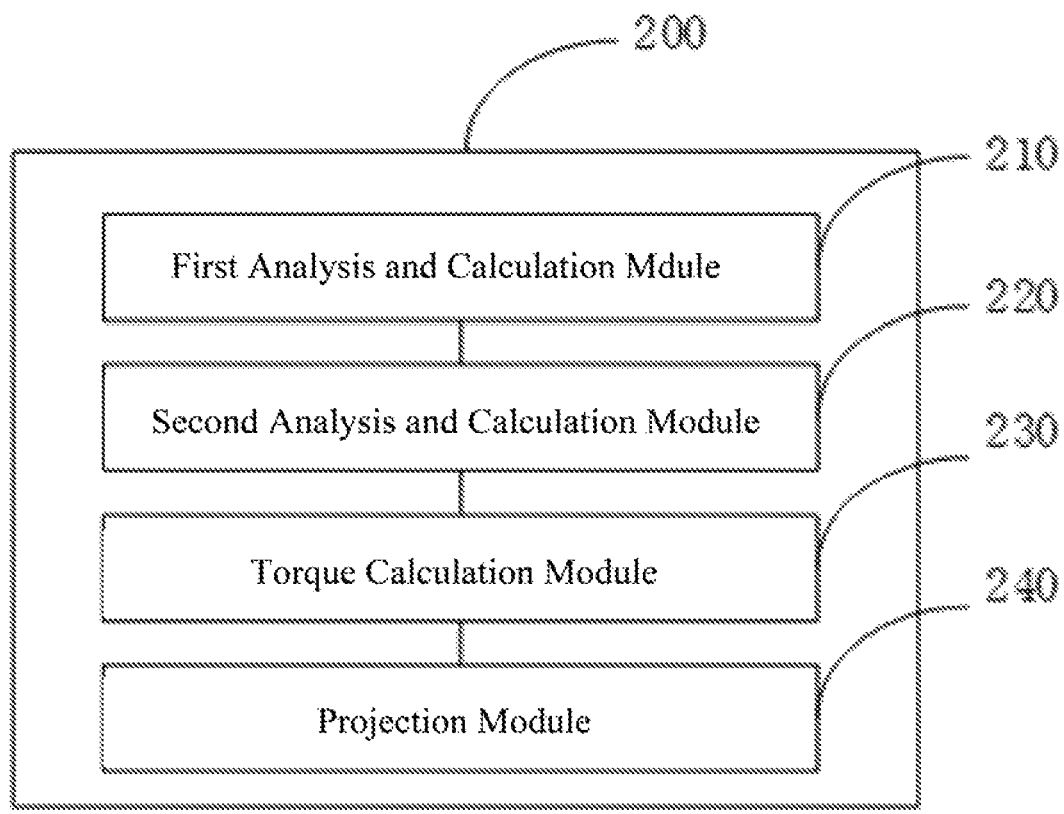
FIG. 5 is a schematic diagram of an embodiment of a joint control apparatus for a serial robot according to the present disclosure.

FIG. 5 is a schematic diagram of an embodiment of an joint control apparatus for a serial robot according to the present disclosure. In this embodiment, a joint control apparatus 200 for a serial robot is provided, where the serial robot has joints connected in series, and each of the joints includes a motor and a connecting rod driven by the motor. The joint control apparatus 200 corresponds to the joint control method for a serial robot in embodiment one, and the joint control method in embodiment one is also applicable to the joint control apparatus 200 which is not described herein.

The joint control apparatus 200 includes a first analysis and calculation module 210, a second analysis and calculation module 220, a torque calculation module 230, and a projection module 240.

The first analysis and calculation module 210 is configured to perform a first force analysis on an end joint in the plurality of joints based on a force of a previous joint adjoining the end joint acting on the end joint and an external force acting on the end joint, and calculate the force of the previous joint acting on the end joint based on a result of the first force analysis.

The second analysis and calculation module 220 is configured to perform a second force analysis on each of the other joints in the plurality of joints based on a force of a previous joint adjoining the joint acting on the joint and a force of the joint acting on a following joint, and calculate the force of the previous joint acting on the joint based on a result of the second force analysis.

The torque calculation module 230 is configured to obtain an angular velocity and an angular acceleration of each joint after obtaining the force of the previous joint acting on the joint, and calculate a torque corresponding to each joint based on the force of the previous joint acting on the joint, the angular velocity of the joint, and the angular acceleration of the joint.

The projection module 240 is configured to project the torque corresponding to each joint to a motor corresponding to the joint to obtain a torque to be applied to the motor at a current time such that the motor controls the joint to move according to the torque to be applied.

In this embodiment, each of the above-mentioned modules/units is implemented in the form of software, which can be computer program(s) stored in a memory of the joint control apparatus 200 and executable on a processor of the joint control apparatus 200. In other embodiments, each of the above-mentioned modules/units may be implemented in the form of hardware (e.g., a circuit of the joint control apparatus 200 which is coupled to the processor of the joint control apparatus 200) or a combination of hardware and software (e.g., a circuit with a single chip microcomputer).

Figure 6:
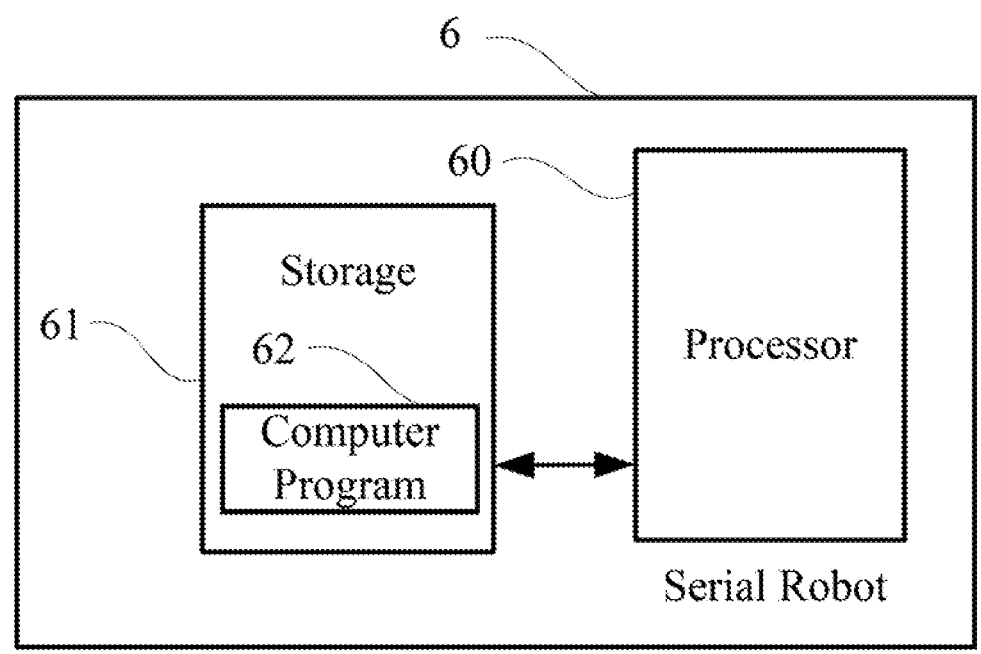
FIG. 6 is a schematic diagram of an embodiment of a serial robot according to the present disclosure.

FIG. 6 is a schematic diagram of an embodiment of a serial robot according to the present disclosure. In this embodiment, a serial robot 6 is provided. In which, the serial robot 6 has joints connected in series, where each joint includes a motor and a connecting rod driven by the motor. The serial robot 6 includes a storage 61, a processor 60, and a computer program 62 stored in the storage and executable on the processor 60. When executing (instructions in) the computer program, the processor implements the steps in the above-mentioned method embodiment one, for example, steps S110-S140 shown in FIG. 1. Alternatively, when the processor executes the (instructions in) computer program 62, the functions of each module/unit in the above-mentioned device embodiments, for example, the functions of the modules 210-240 shown in FIG. 5 are implemented.

The storage 61 may include a program storage area and a data storage area, where the program storage area may store an operating system, an application required by at least one function, and the like; the data storage area may store data created according to the operations of a computing device (e.g., the acceleration compensation apparatus 200), and the like. Furthermore, the storage 61 may include a high speed random access memory (RAM), and may also include a nonvolatile memory such as at least one of a magnetic disk, a flash memory, or other volatile solid state storage device.

In the present disclosure, a computer storage medium is further provided, which is for storing the joint control method for a serial robot which is used in the above-mentioned serial robot.

In the joint control method and the serial robot of the present disclosure, a structure array is created for each joint of the serial robot to store the joint attribute information and the joint motion information calculated based on the joint attribute information. In the execution process of the joint control method, all the information in the structure array corresponding to each joint is directly called through a small amount of codes in a looping and iterative manner, thereby executing the described joint control method efficiently. The joint motion information is calculated through the inverse dynamics equation and the iterative method, so as to avoid the necessary to calculate the above-mentioned M, C, and G matrix, thereby reducing the computational amount and complexity of the algorithm. Through the inverse dynamics method, starting from the end joint, the required torque of each joint and the interaction forces between the joints are sequentially calculated in an iterative manner, which has a simple algorithm, lesser codes, lower algorithm complexity. As a result, the hard real-time control can be realized in 1 millisecond, the tracking precision of the end joint is improved, the tracking error is reduced, and the quick walking capability of serial robot is improved.

It should be understood from the above-mentioned embodiments that, the disclosed apparatus and method may also be implemented in other manners. The above-mentioned apparatus embodiment is merely exemplary. For example, the flow charts and schematic diagrams in the drawings show the architecture, functionality, and operation which are possible to be implemented based on the apparatus, method, and computer program of the above-mentioned embodiments. In which, each block of the flow chart or the block diagram may represent a module, a program segment, or a portion of codes that includes one or more executable instructions for realizing specific logical functions. It should be noted that, in other embodiments, the functions illustrated in the blocks may also be executed in different orders than those shown in the drawings. For example, two consecutive blocks may be executed in parallel, and they may sometimes be executed in a reverse order, which depends upon the functionality involved. It should also be noted that, each block in the block diagram and/or the flow chart and a combination of the blocks in the block diagram and/or the flow chart can be implemented through a dedicated hardware-based system for performing the specific functions or operations, or be implemented through a combination of dedicated hardware and computer instructions.

In addition, all the functional modules or units of each embodiment of the present disclosure may be integrated to form an independent part, or exist separately, or two or more of the modules or units may be integrated to form an independent part.

When the above-mentioned function is implemented in the form of a software functional unit and is sold or used as an independent product, which may be stored in a non-transitory computer-readable storage medium. Based on this understanding, all or a part of the technical solution of the present disclosure which is fundamental or contributes to the prior art or a part of the technical solution may be implemented in the form of a software product stored in a storage medium, which includes instruction(s) used to make a computing device (e.g., a smartphone, a personal computer, a server, or a network device) to perform all or part of the steps of the method described in each embodiment. The above-mentioned storage medium may include a USB flash drive, n portable hard disk, a read-only memory (ROM), a random access memory (RAM), a magnetic disk, an optical disk, or other media capable of storing program codes.

The forgoing is only the specific embodiment of the present disclosure, while the scope of the present disclosure is not limited thereto. For those skilled in the art, various equivalent modifications or replacements can still be easily conceived within the technical scope of the present disclosure, and the modifications or replacements should be included within the scope of the present disclosure.

What is claimed is:

1. A computer-implemented joint control method for a serial robot having a plurality of joints connected in series each comprising a motor, comprising executing on a processor of the serial robot steps of:

performing a first force analysis on an end joint in the plurality of joints based on a force of a previous joint adjoining the end joint acting on the end joint and an external force acting on the end joint, and calculating the force of the previous joint acting on the end joint based on a result of the first force analysis;

performing a second force analysis on each of the other joints in the plurality of joints based on a force of a previous joint adjoining the joint acting on the joint and a force of the joint acting on a following joint, and calculating the force of the previous joint acting on the joint based on a result of the second force analysis;

obtaining an angular velocity and an angular acceleration of each joint after obtaining the force of the previous joint acting on the joint, and calculating a torque corresponding to each joint based on the force of the previous joint acting on the joint, the angular velocity of the joint, and the angular acceleration of the joint; and projecting the torque corresponding to each joint to a motor corresponding to the joint to obtain a torque to be applied to the motor at a current time such that the motor controls the joint to move according to the torque to be applied.

2. The method of claim 1, wherein the torque corresponding to the end joint is calculated through the following equation:

$$N_{n-1,n} = I_n \cdot \ddot{\theta}_n + \dot{\theta}_n \times I_n \dot{\theta}_n - N_{out} - r_1 \times F_{n-1,n} - r_2 \times F_{out};$$

where, $N_{n-1,n}$ is the torque corresponding to the n-th joint, $I_n$ is a rotational inertia of a centroid coordinate system of the end joint, $\dot{\theta}_n$ is the angular velocity of the n-th joint, $\ddot{\theta}_n$ is the angular acceleration of the n-th joint, $N_{out}$ is an external torque of an external environment with respect to the end joint of the serial robot, $F_{n-1,n}$ is a force of the i-1-th joint acting on the i-th joint, $r_1$ is a vector of the force $F_{n-1,n}$ to a centroid of the i-th joint, $F_{out}$ is an external force of the external environment with respect to the end joint of the serial robot, $r_2$ is a vector of the force $F_{out}$ to the centroid of the i-th joint.

3. The method of claim 2, wherein the torque corresponding to each of the other joints in the plurality of joint is calculated through the following equation:

$$N_{n-2,n-1} = I_{n-1} \cdot \ddot{\theta}_{n-1} + \dot{\theta}_{n-1} \times I_{n-1} \dot{\theta}_{n-1} - N_{out} - r_3 \times F_{n-2,n-1} - r_4 \times F_{n-1,n};$$

where, $N_{n-2,n-1}$ is the torque corresponding to the n-1-th joint, $I_{n-1}$ is the rotational inertia of a centroid coordinate system of the end joint, $\dot{\theta}_{n-1}$ is the angular velocity of the n-1-th joint, $\ddot{\theta}_{n-1}$ is the angular acceleration of the n-1-th joint, $N_{out}$ is an external torque of an external environment with respect to the end joint of the serial robot, $F_{n-2,n-1}$ is a force of the i-2-th joint acting on the i-1-th joint, $r_3$ is a vector of the force $F_{n-2,n-1}$ to a centroid of the i-1-th joint, $F_{n-1,n}$ is a force of the i-1-th joint acting on the i-th joint, $r_4$ is a vector of the force $F_{n-1,n}$ to the centroid of the i-1-th joint.

4. The method of claim 1, further comprising:

constructing a structure array for each joint of the serial robot, wherein the structure array comprises joint attribute information and joint motion information calculated based on the joint attribute information, and the joint motion information comprises the angular velocity of the joint and the angular acceleration of the joint.

5. The method of claim 4, wherein the joint attribute information comprises a space vector of a rotational shift of the motor in the joint and a rotational angle of the motor in the joint, and the method further comprises:

calculating a posture of the joint in a world coordinate system based on the space vector of the rotational shaft of the motor in the joint and the rotational angle of the motor in the joint;

calculating an joint angle of the joint based on the posture of the joint in the world coordinate system; and differentiating the joint angle by time through the following equation to obtain the angular velocity of the joint:

$$\dot{\theta} = \frac{d\theta}{dt} = J_{end}^{-1} \cdot V;$$

where, $\dot{\theta}$ is the angular velocity of the joint, $\theta$ is the joint angle, $J_{end}^{-1}$ is an inverse matrix of the Jacobian matrix of a centroid of the end joint, and V is the velocity of the end joint.

6. The method of claim 5, further comprising calculating the angular acceleration of the joint through the following equation:

$$\ddot{\theta}=J_{end}^{-1} \cdot (A-\dot{J}_{end} \cdot \dot{\theta});$$

where, $\ddot{\theta}$ is the angular acceleration of the joint, A is an acceleration of the centroid of the end joint, $\dot{J}_{end}$ is a matrix obtained by deriving the Jacobian matrix of the centroid of the end joint.

7. The method of claim 6, wherein the acceleration of the centroid of the end joint is calculate through the following steps:
   obtaining a velocity of a coordinate system origin in the world coordinate system of the end joint based on the angular velocity of the end joint and the Jacobian matrix of the coordinate system origin of the end joint;
   obtaining a velocity of the centroid of the end joint in the world coordinate system based on the velocity of the coordinate system origin in the world coordinate system of the end joint; and
   deriving the velocity of the centroid of the end joint in the world coordinate system by time to obtain the acceleration of the centroid of the end joint.

8. The method of claim 4, further comprising:
   initializing the joint attribute information of each joint at a preset interval, and calculating the joint motion information based on the initialized joint attribute information.

9. A serial robot, comprising:
   a plurality of joints connected in series each comprising a motor;
   a memory;
   a processor; and
   one or more computer programs stored in the memory and executable on the processor, wherein the one or more computer programs comprise:
   instructions for performing a first force analysis on an end joint in the plurality of joints based on a force of a previous joint adjoining the end joint acting on the end joint and an external force acting on the end joint, and calculating the force of the previous joint acting on the end joint based on a result of the first force analysis;
   instructions for performing a second force analysis on each of the other joints in the plurality of joints based on a force of a previous joint adjoining the joint acting on the joint and a force of the joint acting on a following joint, and calculating the force of the previous joint acting on the joint based on a result of the second force analysis;
   instructions for obtaining an angular velocity and an angular acceleration of each joint after obtaining the force of the previous joint acting on the joint, and calculating a torque corresponding to each joint based on the force of the previous joint acting on the joint, the angular velocity of the joint, and the angular acceleration of the joint; and
   instructions for projecting the torque corresponding to each joint to a motor corresponding to the joint to obtain a toque to be applied to the motor at a current time such that the motor controls the joint to move according to the torque to be applied.

10. The robot of claim 9, wherein the torque corresponding to the end joint is calculated through the following equation:

$$N_{n-1,n}=I_n \cdot \ddot{\theta}_n + \dot{\theta}_n \times I_n \dot{\theta}_n - N_{out} - r_1 \times F_{n-1,n} - r_2 \times F_{out};$$

where, $N_{n-1,n}$ is the torque corresponding to the n-th joint, $I_n$ is a rotational inertia of a centroid coordinate system of the end joint, $\dot{\theta}_n$ is the angular velocity of the n-th joint, $\ddot{\theta}_n$ is the angular acceleration of the n-th joint, $N_{out}$ is an external torque of an external environment with respect to the end joint of the serial robot. $F_{n-1,n}$ is a force of the i-1-th joint acting on the i-th joint, $r_1$ is a vector of the force $F_{n-1,n}$ to a centroid of the i-th joint, $F_{out}$ is an external force of the external environment with respect to the end joint of the serial robot, $r_2$ is a vector of the force $F_{out}$ to the centroid of the i-th joint.

11. The robot of claim 10, wherein the torque corresponding to each of the other joints in the plurality of joint is calculated through the following equation:

$$N_{n-2,n-1}=I_{n-1} \cdot \ddot{\theta}_{n-1} + \dot{\theta}_{n-1} \times I_{n-1} \dot{\theta}_{n-1} - N_{out} - r_3 \times F_{n-2,n-1} - r_4 \times F_{n-1,n};$$

where, $N_{n-2,n-1}$ is the torque corresponding to the n-1-th joint, $I_{n-1}$ is the rotational inertia of a centroid coordinate system of the end joint, $\dot{\theta}_{n-1}$ is the angular velocity of the n-1-th joint, $\ddot{\theta}_{n-1}$ is the angular acceleration of the n-1-th joint, $N_{out}$ is an external torque of an external environment with respect to the end joint of the serial robot, $F_{n-2,n-1}$ is a force of the i-2-th joint acting on the i-1-th joint, $r_3$ is a vector of the force $F_{n-2,n-1}$ to a centroid of the i-1-th joint, $F_{n-1,n}$ is a force of the i-1-th joint acting on the i-th joint, $r_4$ is a vector of the force $F_{n-1,n}$ to the centroid of the i-1-th joint.

12. The robot of claim 9, wherein the one or more computer programs further comprise:
   instructions for constructing a structure array for each joint of the serial robot, wherein the structure array comprises joint attribute information and joint motion information calculated based on the joint attribute information, and the joint motion information comprises the angular velocity of the joint and the angular acceleration of the joint.

13. The robot of claim 12, wherein the joint attribute information comprises a space vector of a rotational shaft of the motor in the joint and a rotational angle of the motor in the joint, and the one or more computer programs further comprise:
   instructions for calculating a posture of the joint in a world coordinate system based on the space vector of the rotational shaft of the motor in the joint and the rotational angle of the motor in the joint;
   instructions for calculating an joint angle of the joint based on the posture of the joint in the world coordinate system; and
   instructions for differentiating the joint angle by time through the following equation to obtain the angular velocity of the joint:

$$\dot{\theta} = \frac{d\theta}{dt} = J_{end}^{-1} \cdot V;$$

where, $\dot{\theta}$ is the angular velocity of the joint, $\theta$ is the joint angle, $J_{end}^{-1}$ is an inverse matrix of the Jacobian matrix of a centroid of the end joint, and V is the velocity of the end joint.

14. The robot of claim 13, wherein the one or more computer programs further comprises:
   instructions for calculating the angular acceleration of the joint through the following equation:

$$\ddot{\theta}=J_{end}^{-1} \cdot (A-\dot{J}_{end} \cdot \dot{\theta});$$

where, $\ddot{\theta}$ is the angular acceleration of the joint, A is an acceleration of the centroid of the end joint, $\dot{J}_{end}$ is a matrix obtained by deriving the Jacobian matrix of the centroid of the end joint.

15. The robot of claim 14, wherein the acceleration of the centroid of the end joint is calculate through the following instructions:
    instructions for obtaining a velocity of a coordinate system origin in the world coordinate system of the end joint based on the angular velocity of the end joint and the Jacobian matrix of the coordinate system origin of the end joint;
    obtaining a velocity of the centroid of the end joint in the world coordinate system based on the velocity of the coordinate system origin in the world coordinate system of the end joint; and
    deriving the velocity of the centroid of the end joint in the world coordinate system by time to obtain the acceleration of the centroid of the end joint.

16. The robot of claim 12, the one or more computer programs further comprises:
    instructions for initializing the joint attribute information of each joint at a preset interval, and calculating the joint motion information based on the initialized joint attribute information.

* * * * *